FIG.1.

INVENTOR.
HENRI-GEORGES DOLL
BY
Campbell, Brumbaugh & Free
HIS ATTORNEYS.

INVENTOR.
HENRI-GEORGES DOLL
BY
HIS ATTORNEYS.

April 9, 1957     HENRI-GEORGES DOLL     2,788,483

PHASE REJECTION NETWORKS

Filed May 24, 1947     3 Sheets-Sheet 3

INVENTOR.
HENRI-GEORGES DOLL
BY
Campbell, Brumbaugh & Free
HIS ATTORNEYS.

United States Patent Office 2,788,483
Patented Apr. 9, 1957

2,788,483

PHASE REJECTION NETWORKS

Henri-Georges Doll, Ridgefield, Conn., assignor, by mesne assignments, to Schlumberger Well Surveying Corporation, Houston, Tex., a corporation of Delaware Application May 24, 1947, Serial No. 750,307

42 Claims. (Cl. 324—6)

The present invention relates to phase selective, alternating current networks. More specifically, it relates to new and improved alternating current networks for segregating alternating current signal components of given phase from alternating current signal components of different phase in order that they may be modified or utilized in any desired manner.

In many alternating current networks, a requirement exists for the segregation of alternating current signal components of given phase from signal components of different phase. In mutual impedance bridges of the type used in the electrical logging of earth formations traversed by a drill hole, for example, it is frequently necessary to suppress one of two signal components, generally in quadrature with respect to one another, in order that another signal component may be observed as an indication of the presence of the body or earth stratum being sought. Thus, in searching for magnetic veins in the vicinity of a drill hole, the water in the hole which is sometimes extremely conductive, may produce a strong resistive signal component which should be suppressed in order that reactive signal components characteristic of the magnetic vein may be observed. Similarly, when non-magnetic conductive masses are being sought, trouble may be experienced from worthless magnetic earth materials which produce a strong inductive signal component. The latter should be suppressed in order that the conductive masses may be located, and in order that variations in conductivity of the geologic formations through which the drill hole passes may be logged.

Temperature variations along the well tend to change the mutual inductance between the transmitter and receiver coils which are lowered into a drill hole in spaced relationship in well logging operations. This sometimes produces a reactive signal which causes the zero reference of the system to drift. In order to eliminate the drift, it is desirable to suppress the reactive signal causing it. Also, spurious reactive signals which may result from relative mechanical movement between the transmitter and receiver coils should be suppressed.

The principal object of the present invention, accordingly, is to provide new and improved alternating current networks that are phase selective with respect to alternating current signal components of the same frequency but of different phases.

Another object of the invention is to provide new and improved electric networks of the above character in which a vector component of predetermined phase of a given alternating current signal may be segregated in order that it can be measured or otherwise utilized.

A further object of the invention is to provide new and improved phase selective circuits in which an undesired variable component of predetermined phase of a given alternating current signal is continuously suppressed in order that another signal component of different phase may be observed or measured.

Still another object of the invention is to provide phase selective systems in which one or more components of different phases of a variable alternating current signal of given frequency are continuously suppressed and wherein one or more of the suppressed signals are observed or measured.

Another object of the invention is to provide a novel well logging method and apparatus utilizing electromagnetic principles in which significant indications of the electrical conductivity and/or electro-magnetic properties of earth formations surrounding a bore hole drilled into the earth may be obtained.

A still further object of the invention is to provide a new and improved well logging apparatus in which means are provided for compensating for any drift such as might be caused by thermal expansion and contraction of the apparatus, for example.

The objects of the invention are attained, in accordance with the invention, by combining with the alternating current signal component of given frequency to which phase selection is to be applied an alternating current signal of such phase and magnitude that it will substantially cancel the undesired component which is to be suppressed. The suppressing signal of predetermined phase is preferably furnished by a circuit hereinafter designated as a "variometer tube circuit," which includes an electronic tube of controllable mutual conductance. The variometer tube circuit is so designed that for an input signal of given phase, the output therefrom has the correct phase for combining with the alternating current signal component in order to effect the desired phase selection. Also, the magnitude of the alternating current signal from the variometer tube circuit may be varied by adjusting the biasing voltage applied to the control grid of the controllable mutual conductance tube.

In order to adjust the magnitude of the output signal from the variometer tube circuit continuously, according to the invention, the bias voltage applied to the control grid of the controllable mutual conductance tube is automatically varied in response to variations in a vector component of a predetermined phase that is to be suppressed.

In one embodiment of the invention, the input of given phase for the variometer tube circuit is taken from the input side of a conventional four terminal network, and the output of the variometer tube circuit is used to suppress an undesired signal of given phase in the output side of the network. Continuous and automatic suppression of the output signal component of undesired phase is accomplished by using a portion of that signal component, after amplification if necessary, to control the bias voltage applied to the control grid of the controllable mutual inductance tube in the variometer tube circuit. Suppression of the undesired signal component enables signal components of other phase to be observed, if desired.

Means are also provided, according to the invention, for obtaining indications of the magnitude or variations in the magnitude of the signal component being suppressed.

According to another embodiment of the invention, two variometer tube circuits are employed in a four terminal network, as described above, for suppressing two components of different phases of an alternating current signal of given frequency, and means are provided for obtaining indications of the magnitude or variations in the magnitude of one or both of the suppressed signal components.

Additional objects and advantages of the invention will be apparent from the following detailed description, taken in conjunction with the accompanying drawings, in which.

While the invention can be applied to any four terminal electrical network, as indicated above, it will be illustrated herein as applied to an impedance bridge of the type used to explore drill holes electrically or to make geophysical surveys.

Figure 1:
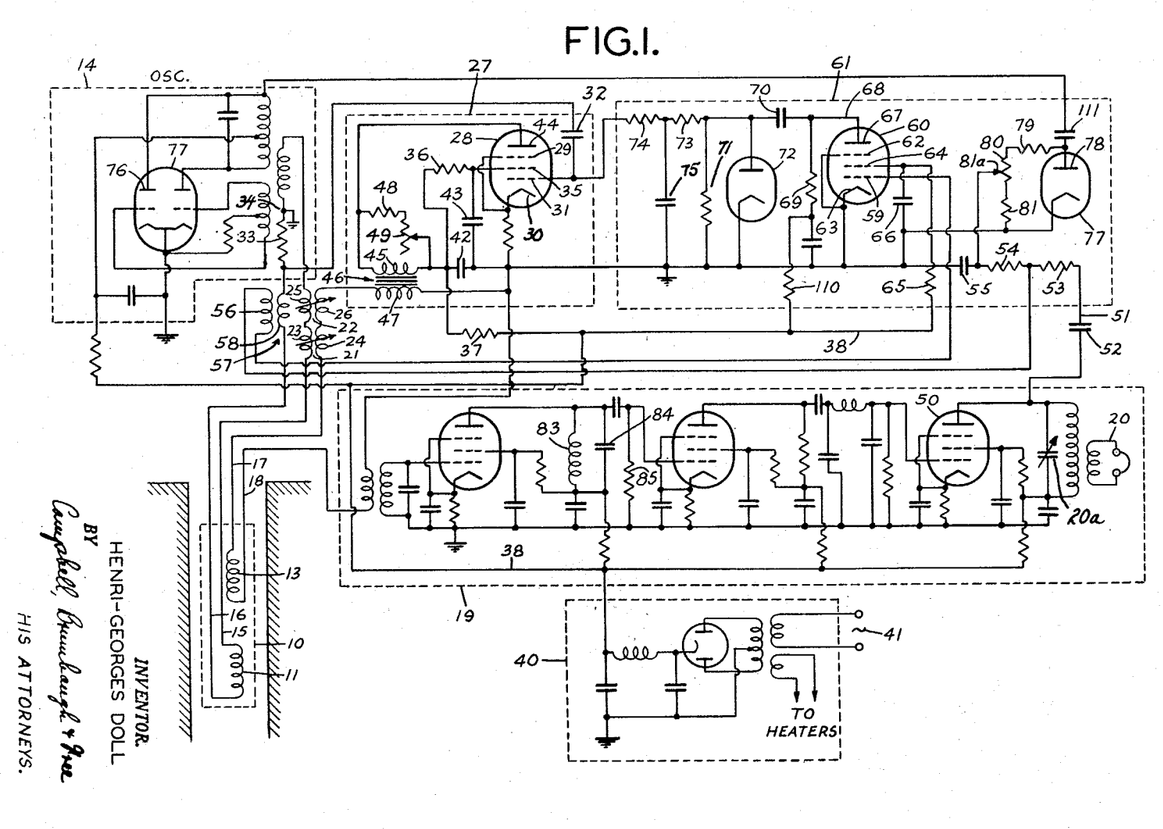
Figure 1 is a schematic diagram of apparatus constructed according to the invention, for electrically exploring the region surrounding drill holes, or for making geophysical surveys.

Referring now to Figure 1, the well logging or ore locating apparatus comprises a search coil assembly 10 having a transmitter coil 11 and a receiver coil 13 disposed in inductive relationship thereto. The search coil assembly 10 may be of any suitable type, its mechanical form being determined partially by whether it is to be used in a drill hole, or in surface exploration. In the latter case, it may be similar to the apparatus disclosed in my copending application Serial No. 595,573, for "Coil Assembly for Geophysical Prospecting," filed May 24, 1945, for example. For certain applications, the transmitter and receiver coils may not be assembled together but may be movable relatively to one another, particularly in surface exploration. The transmitter coil 11 is supplied with alternating current from any suitable electronic oscillator 14 through the conductors 15 and 16 as shown.

The receiver coil 13 is connected by the conductors 17 and 18 to the input terminals of an amplifier 19, the output of which is impressed upon any suitable indicating device, such as, for example, a pair of head phones. The direct mutual inductance between the transmitter coil 11 and the receiver coil 13 is preferably nullified in any suitable manner, as by the variometer 21 for example.

If the portion of the detecting apparatus described above is energized, and the search coil assembly 10 is brought into the vicinity of magnetic earth formations, it is found that a strong reactive signal component is picked up which is of such magnitude as to mask other desirable signals that might be produced by conducting masses or strata, the position of which it is desired to determine. For any given position of the search coil assembly 10 with respect to the magnetic earth formations, any signals caused thereby can be completely cancelled out by proper adjustment of the variometers 21 and 22, as is known in the art.

The variometer 21 serves to inject into the circuit of the receiver coil 13 a voltage that is opposite in sense to any reactive signal that may be picked up and it may comprise, for example, the primary winding 23 connected in series with the energizing conductor 15 and the secondary winding 24 connected in series with the conductor 17, conventional means being provided for varying the mutual inductance between windings 23 and 24. The variometer 22 is designed to have substantially zero mutual inductance and to inject into the circuit of the receiver coil 13 a resistive voltage opposite in sense to any resistive signal that may be picked up and it may comprise a primary winding 25 connected in series with the energizing conductor 15 and the secondary winding 26 connected in series with the conductor 17. A resistive signal may be produced by providing a conducting core, such as a brass rod (not shown), for example, for the windings 25 and 26. Other means may be used for providing mutual resistance between the transmitter and receiver coil circuits such as those disclosed in my prior application Serial No. 653,184, filed March 8, 1946, for Methods and Apparatus for Balancing Alternating Current Networks, now Patent No. 2,463,252, for example. If the mutual impedance between the transmitter coil 11 and the receiver coil 13 is small, due to their separation, it may be possible to omit one or both of the variometers 21 and 22 and to establish balance primarily by use of the variometer tube circuit.

It has been found, however, that although the system can be balanced for any given position of the search coil assembly 10 by proper adjustment of the variometers 21 and 22, it becomes immediately unbalanced when the search coil assembly 10 is moved to another position with respect to the magnetic earth formations. It is proposed, according to the invention, to maintain the system continuously in balance by injecting into the circuit of the receiver coil 13 a voltage of proper phase and magnitude to cancel out any unwanted signal component of given phase or magnitude (in this case a reactive signal component) that may be picked up by the receiver coil assembly 13. This is accomplished by means of the variometer tube circuit 27.

As shown in Figure 1, the variometer tube circuit 27 comprises a conventional electronic tube 28 which may be a pentode having a suppressor grid 29 tied to the cathode 30. The control grid 31 of the pentode 28 is connected in series with a condenser 32 to one terminal of a resistor 33 which is connected in series with the energizing conductor 16, the other terminal of the resistor 33 being grounded at 34, as shown. It will be understood that the voltage applied to the control grid 31 from the resistor 33 is in phase with the alternating current supplied from the oscillator 14 to the transmitter coil 11 in the search coil assembly 10.

The screen grid electrode 35 of the tube 28 is connected in series with the voltage dropping resistors 36 and 37 and the conductor 38 to the positive terminal of a conventional A. C. rectifier-filter type plate supply 40 which is connected to a source of A. C. 41. The voltage fed to the screen grid electrode 35 is preferably filtered in the usual manner by means of the shunt condensers 42 and 43.

The plate electrode 44 of the pentode 28 is connected through the primary winding 45 of a transformer 46 to the common point between the voltage dropping resistors 36 and 37 thus providing plate voltage from the plate supply 40 for the pentode 28. The secondary winding 47 of the transformer 46 is connected in series with the conductor 17 which is in circuit with the receiver coil 13.

The variometer tube circuit 27 is preferably so designed that the phase shift between a signal applied to the control grid 31 thereof and the signal output at the secondary winding 47 of the transformer 46 is substantially independent of frequency. To this end, the transformer 46 should be carefully designed to have a relatively low impedance with respect to the plate resistance of the pentode 28, and should preferably have a powdered Permalloy core so as to reduce eddy current losses to an absolute minimum. A fixed resistor 48 and a variable resistor 49 may be connected in shunt with the primary winding 45 of the transformer 46 to provide for some adjustment of phase shift, if necessary.

The pentode 28 is preferably of the variable transconductance type in which the gain is a function of the biasing voltage applied to the control grid 31. By adjusting the voltage bias on the control grid 31 of the tube 28, a voltage may be injected into the circuit of the search coil receiver 13 which is either in phase or 180° out of phase with the voltage induced therein from the transmitter coil 11, depending on the phase of the input signal to the control grid 31 of the pentode 28, and the coupling between the variometer tube circuit 27 and the circuit of the receiver coil 13 through the transformer 46. It will be readily apparent that, by proper adjustment of the biasing voltage on the control grid 31, and with the proper connections, any reactive signal picked up by the search coil receiver 13 can be completely cancelled out.

Cancellation of the undesired reactive signal is accomplished automatically according to the invention, by controlling the grid bias applied to the control grid 31 of the variometer tube in accordance with the magnitude of any signal component of the unwanted phase existing in the circuit of the receiver coil 13 and consequently appearing, as amplified, in the output of the amplifier 19. To this end, the output from the final tube 50 in the amplifier 19 may be fed through the conductor 51 and a D. C. blocking condenser 52 to a voltage divider circuit including the resistors 53 and 54, the condenser 55 providing a low impedance path to ground for alternating currents. A portion of the output of the amplifier 19 appearing across the resistor 54 is fed to a phase selective circuit 61 which provides a D. C. bias for the control grid 31 of the tube 28 that varies with changes in the magnitude of any signal component of unwanted phase existing in the receiver coil circuit and appearing, as amplified, in the output of the amplifier 19.

The phase selective circuit 61 comprises, for example, a conventional pentode tube 60, the control grid 59 of which is connected in series with the secondary winding 56 of a transformer 57 to the common point between the resistors 53 and 54. The primary winding 58 of the transformer 57 is connected in series with the energizing conductor 16. The transformer 57 serves to inject into the grid circuit of the tube 60 an alternating voltage of relatively large magnitude that is 90° out of phase with the current flowing in the conductor 16. This voltage is combined with the feedback voltage from the amplifier 19 to effect phase selection as will be described in greater detail below.

The suppressor grid 62 of the tube 60 is tied to the cathode 63 and the screen grid electrode 64 is connected through a voltage dropping resistor 65 to the conductor 38 leading to the positive terminal of the plate power supply 40, a filter condenser 66 being connected between the screen grid electrode 64 and ground, as shown. The plate electrode 67 of the tube 60 is connected by a conductor 68 to the plate resistor 69 which is connected to the conductor 38 leading through the decoupling resistor 110 to the plate supply 40. The output of the tube 60 is fed through a blocking condenser 70 to a resistor 71 grounded at its other end, which is shunted by a conventional diode rectifier 72, as shown. The rectified voltage appearing across the resistor 71 is filtered by a conventional two-stage resistance capacitance filter comprising the series resistors 73 and 74 and the condensers 75 and 32 and the resulting D. C. voltage is impressed upon the control grid 31 of the pentode 28.

The bias voltage for the phase-selective tube 60 should be relatively large as required for class "C" operation and it may be provided in any suitable manner, as for example, by rectifying a portion of the output of the oscillator 14. Thus, a portion of the output from the plate electrode 76 of the oscillator tube 77 is connected through a D. C. blocking condenser 111 to the plate electrode 78 of another conventional diode rectifier 77, the resistors 79, 80 and 81 being connected between the plate electrode 78 and ground, as shown. The resistor 80 has a variable contact 81a which is connected by a conductor 82 to the common point between the resistor 54 and the condenser 55, thus supplying an adjustable D. C. biasing voltage to the control grid 59 of the tube 60.

If the variometer tube circuit 27 is connected so as to inject into the circuit of the receiver coil 13 a cancelling voltage that is opposite in phase to the unwanted signal component, the phase selective rectifier 61 should be so connected that the unwanted signal component, as it appears in the output of the amplifier 19, is subtractively combined with the voltage injected into the grid circuit of the tube 60 by the transformer 57. When so connected, the phase selective circuit 61 supplies to the control grid 31 of the variometer tube 28 a D. C. bias that becomes less negative as the magnitude of the unwanted signal component in the receiver circuit increases, thus continuously effecting substantially complete suppression of the unwanted signal component.

If the output of the amplifier 19 corresponding to the unwanted component does not have the proper phase to enable subtractive combination to be effected, its phase may be varied in any desired manner, as by adjusting a condenser 20a which provides a shunt path for the amplifier output, for example. Alternatively, the phase of the voltage injected into the grid circuit of the tube 60 by the transformer 57 might be adjusted by conventional means to bring it into the proper subtractive relationship with the output of the amplifier 19.

It will be noted, however, that the system will lose control if the magnitude of the unwanted signal component from the output of the amplifier 19 that is fed to the control grid 59 of the tube 60 ever becomes greater in magnitude than the combining voltage supplied from the transformer 57. This condition can be readily prevented from arising by proper design of the voltage divider circuit which is connected to the output of the amplifier 19 and by proper adjustment of the bias applied to the grid 59 of the tube 60 and of the magnitude of the voltage supplied by the transformer 57. Obviously, the voltage divider circuit can be eliminated and the entire output of the amplifier 19 supplied to the grid 59 of the tube 60, provided that both the negative bias on the grid 59 and the voltage supplied by the transformer 57 are made large enough to keep the system from losing control under all operating conditions.

In operation, preferably the variometers 21 and 22 are first adjusted to cancel out substantially all of the unwanted signal appearing in the circuit of the receiver coil 13, including any signal output of the variometer tube circuit 27, when the search coil assembly 10 is located at a predetermined position with respect to the surface of magnetic earth. The variometer tube circuit 27 is preferably so connected that it injects into the circuit of the receiver coil 13 a voltage that is 180° out of phase with the unwanted reactive voltage component appearing in that circuit; also, the pentode 60 in the phase selective circuit 61 is preferably biased very negatively so that it operates as a class "C" amplifier and the connections are made so that an increasing signal of the unwanted phase appearing in the receiver circuit and amplified by the amplifier 19 tends to reduce the negative grid bias of the control grid 31 of the pentode 28, and, thus, to increase the magnitude of the cancelling voltage of opposite phase injected into the circuit of the receiver coil 13.

With the system adjusted as indicated above, it will be readily apparent that any variable signal component of unwanted phase appearing in the circuit of the receiver coil 13 will be automatically and continuously cancelled out, except for the small part, which may be as little as one part in five hundred, that is required to supply the D. C. bias change to the control grid of the variometer tube 28. Hence, only resistive signals, which are, in general, characteristic of conductive subterranean bodies or strata, will unbalance the system and give a signal that can be heard in the head phones 20.

It will be understood, further, that the amplifier 19 need not be designed to have a phase shift that is strictly independent of frequency, since the phase selective circuit 61 will function properly even when the phase of the unwanted signal component from the amplifier differs by as much as 30° from the 180° relationship theoretically required for subtractive combination with the signal supplied by the transformer 59. Such a condition would simply result in a small reduction of the efficiency of the system, so that a somewhat larger fraction of the signal of the unwanted phase will have to remain in the receiver circuit in order to furnish to the variometer tube 28 the additional D. C. bias change necessary for approximate cancellation of the unwanted signal. However, the phase of the signal which the variometer tube 28 injects into the receiver coil circuit must be very accurately maintained, i. e., within a small fraction of a degree in certain operations requiring a high degree of cancellation, even through an error of 30° may be tolerated in the phasing of the selective circuit 61, as indicated above.

It is possible that the tube 28 in the variometer circuit 27 may introduce some harmonic distortion into the circuit of the receiver coil 13. Accordingly, it is desirable to provide a suitable filter network in the amplifier 19 to suppress any such harmonics. The tuned circuit comprising the inductance 83 and the condenser 84 acts as a selective filter to discriminate against such harmonics. The band width of this filter may be broadened, if desired, by properly choosing the magnitude of the resistor 85. Other conventional filter circuits may be used for suppressing the harmonics. However, these should be designed so as not to give too rapid a phase shift with change of frequency in the vicinity of the operating frequency of the equipment.

It will be readily understood that, alternately, the system can be so adjusted, if desired, that the voltage injected into the circuit of the receiver coil 13 is in phase with the unwanted signal component, instead of being of opposite phase as previously described. Here again, the two signals are initially substantially cancelled out under given conditions by proper adjustment of the variometers 21 and 22 and the variometer tube circuit 27. In this alternative, the system should be so connected that an increasing output from the amplifier 19 due to a signal of unwanted phase makes the control grid 31 of the tube 28 more negative, thus reducing the magnitude of the voltage injected into the circuit of the receiver coil 13.

The system described above is designed substantially to cancel out any reactive signal component and to permit only resistive components picked up by the receiver coil 13 to produce a signal in the head phones 20. A system of this type is intended primarily for locating conducting ore veins or other conductive bodies which are surrounded by magnetic rock or earth, or to measure the conductivity of the ground in the vicinity of the coil system without introducing errors due to the magnetic permeability of the ground.

Obviously, a system of this type can be adapted to cancel out an undesired signal component of any phase whatsoever. For example, the saline waters found in some drill holes give a large resistive signal component, and it might be desirable to locate earth strata or masses having magnetic permeability different from that of the surrounding medium by modifying the equipment to respond to the reactive component of the signal while the resistive component is suppressed. This may be accomplished in any suitable manner as by substituting a condenser for the resistor 33, for example, so that the cancelled voltage injected into the circuit of the receiver coil 13 will be 90° out of phase with the reactive component and will thus cancel out any resistive component.

Figure 2:
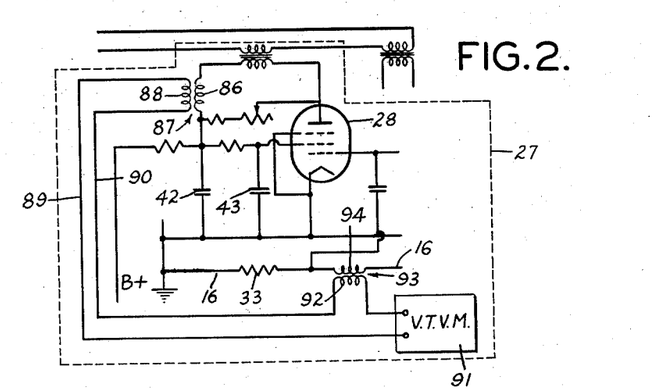
Figure 2 is a schematic diagram illustrating a modification of the variometer tube circuit in Figure 1 which enables variations in the magnitude of the signal component being suppressed to be measured.

If it is desired to measure the magnitude of the unwanted signal component, the system may be modified as indicated in Figure 2. In this embodiment, the output of the variometer tube circuit 27 is compared with a signal of fixed magnitude and of the same phase. Referring to Figure 2, the primary winding 86 of a transformer 87 is connected in the plate circuit of the variometer tube 28. The secondary winding 88 of the transformer 87 is connected by the conductors 89 and 90 to the terminals of a conventional measuring instrument, such as a vacuum tube voltmeter 91, for example. Connected in series with the conductor 90 is the secondary winding 92 of a transformer 93, the primary winding 94 of which is connected in series with the energizing conductor 16.

The transformers 87 and 93 are so designed that the output from the plate circuit of the variometer tube 28 is substantially cancelled out by the output from the secondary winding of the transformer 93 under given reference conditions. While the output of the variometer tube 28 and the output of the secondary winding 88 of the transformer 87 vary proportionally to the undesired component, the output from the secondary winding 92 of the transformer 93 remains constant. Accordingly, the vacuum tube voltmeter 91 will continuously register such variations. In this fashion, resistive signals characteristic of bodies or formations to be detected will produce a signal in the ear phones 20 (Fig. 1), while the vacuum tube voltmeter 91 will provide indications of variations in the magnitude of the unwanted reactive signal which is being suppressed. If the meter 91 is properly calibrated, the actual magnitude of the suppressed signal component can be measured.

Figures 3, 3A:
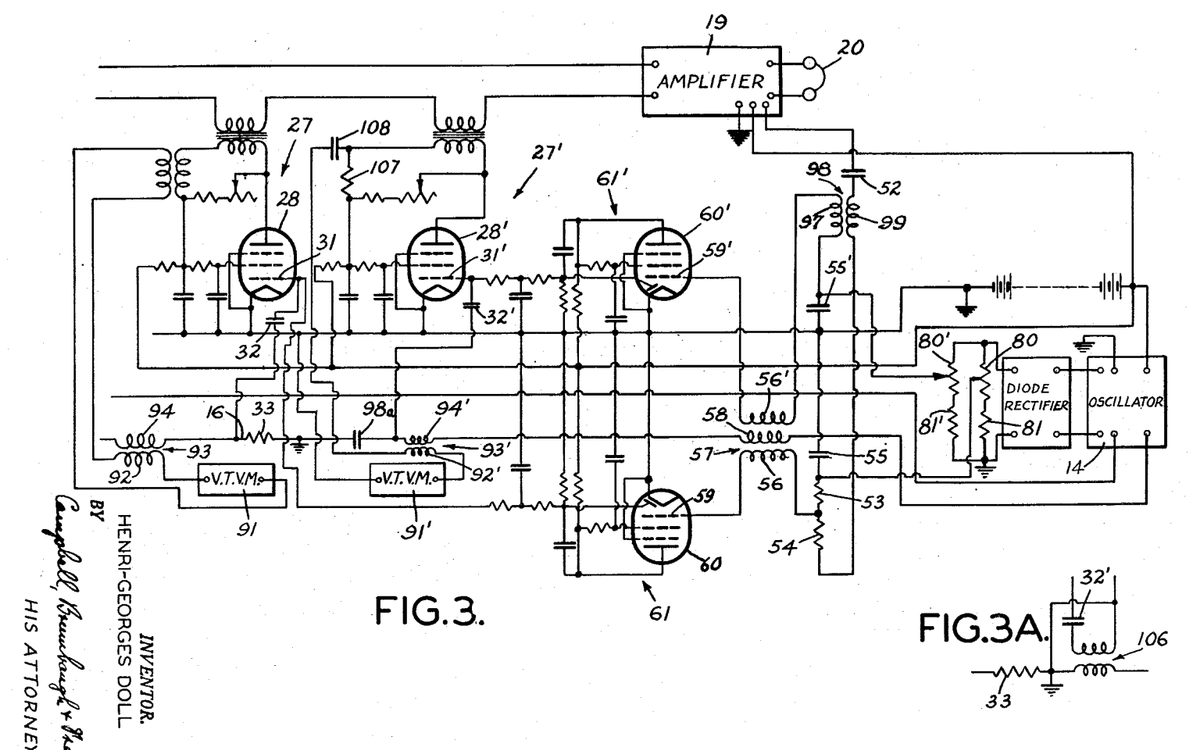
Figure 3 illustrates schematically a further embodiment of the invention, in which two signals in quadrature are continuously suppressed and indications are obtained of the magnitudes or variations in the magnitudes of the suppressed signals.
Figure 3a is a schematic diagram of a modification of a portion of the circuit shown in Figure 3.

In the embodiment illustrated in Figure 3, both reactive and resistive signal components picked up by the receiver coil 13 are suppressed and indications are obtained of variations in the magnitudes of the suppressed signal components. In this form of the invention, two variometer tube circuits 27 and 27' of the type shown in Figure 2 are employed. Since the variometer tube circuits 27 and 27' are substantially identical, common parts in the latter will be designated by common primed reference characters.

The purpose of the variometer tube circuit 27 is to suppress the reactive signal components appearing in the circuit of the receiver coil 13. To this end, the control grid electrode 31 of the pentode 28 is excited by a voltage which is in phase with the currents flowing in the energizing conductor 16. This voltage may be received from one terminal of the resistor 33 through the blocking condenser 32, as in the embodiment shown in Figure 1.

The variometer tube circuit 27' serves to cancel out any resistive signal components picked up by the receiver coil 13. Hence, the control grid electrode 31' of the pentode 28' must be excited by a voltage which is 90° out of phase with the current flowing in the energizing conductor 16. This voltage may be obtained across a condenser 98a connected in series with the conductor 16, which voltage is impressed on the control grid 31' of the pentode 28' through the blocking condenser 32'. Alternatively, it may be obtained from a transformer 106, substituted for the condenser 98a, as shown in Figure 3a.

Biasing voltages for the variometer tube circuits 27 and 27' are provided by the phase selective rectifier circuits 61 and 61', respectively, which are substantially identical with the phase selective rectifier circuit 61, shown in Figure 1. Since the purpose of the variometer tube circuit 27' is to suppress the resistive signal component, the variometer tube 28' must be supplied with D. C. bias that is a function of the resistive signal component output from the amplifier 19. Hence, the control grid electrode 59' of the pentode 60' is supplied with a mixer voltage having the same phase as that impressed upon the control grid 59 of the tube 60. With this is combined the output voltage of the amplifier 19 which is shifted 90° before being added to the mixer voltage, so that the resistive component as it appears in the output of the amplifier 19 is either in phase or out of phase with the mixer voltage supplied to the control grid 59'. The mixer voltage may be provided by another winding 56' on the transformer 57 which is connected in series with the grid 59' of the tube 60', as shown. D. C. bias for the control grid 59' may be supplied from a voltage divider comprising the resistors 80' and 81' which is connected in parallel with the voltage divider comprising the resistors 80 and 81.

Feedback voltage from the amplifier 19 is supplied to the control grid 59' of the tube 60' from the secondary winding 97 of a transformer 98, the primary winding 99 of which is connected in series with the resistors 53 and 54. The voltage supplied by the secondary winding 97 is in phase quadrature with the output current of the amplifier 19, and is therefore in quadrature with the signal from the amplifier 19 that is supplied to the control grid 59 of the tube 60. The condenser 55' serves to bypass alternating currents around the resistors 80' and 81' to ground. For proper operation of the voltmeter 91' a resistor 107 is connected in the plate circuit of the variometer tube 28', which supplies through a blocking condenser 108 a voltage that is combined with the output of the transformer 93' and is fed to the voltmeter 91'.

When the system shown in Figure 3 has been initially adjusted as described above in connection with Figure 1, both resistive and reactive signal components picked up by the receiver coil 13 will be substantially suppressed, except for the small signals required to operate the variometer tubes 28 and 28', so that neither resistive nor reactive signal components occurring subsequent to the initial adjustment will produce a tone in the head phones 20. However, variations in the magnitudes of the resistive and reactive signal components that have been suppressed are continuously indicated by means of the vacuum tube voltmeters 91' and 91, respectively. By proper calibration of the meters 91 and 91' the absolute values of the signal components may be ascertained.

While the phase selective systems described above are intended primarily for the location of geologic structures and metallic ores, it will be understood that they may be readily adapted to a wide variety of other uses. For example, the system illustrated in Figure 3 is especially suitable for the detection of defective articles, such as, for example, a bullet made of magnetic material in which a longitudinal crack exists. If the search coil assembly 10 is brought in the vicinity of such a bullet, either or both the reactive and resistive components as measured by the vacuum voltmeters 91 and 91' would be different from the values obtained from a sound bullet.

The circuits shown in Figure 1 are useful in exploring relatively shallow holes, in which the conductors need be of only moderate length. For deeper holes, the equipment shown in Figure 1 should be included in a waterproof cartridge and lowered into the hole, with the exception of the head phones 20, and the power supply unit 40. The leads from the output of the power supply filter and those from the head phones 20 to the amplifier 19 can be included in a multiconductor cable running from the surface of the earth to the equipment in the drill hole. Coil assemblies suitable for use in well logging are well known, and it will not be necessary to describe one in detail herein. When desirable, the output of the amplifier 19 can be rectified in any suitable manner and a corresponding D. C. signal sent to the surface for measurement or recording.

As an alternative method of logging a drill hole, the equipment described in Figure 3 may be used and readings of either one or both of the meters 91 and 91' may be made simultaneously and continuously as the search coil assembly 10 is moved through a bore hole, or recording meters may be employed, if desired. The meter 91' will provide indications of variations of the electrical conductivity of the earth formations surrounding the bore hole, while the meter 91 will provide indications of the relative magnetic properties of the formations at different depths.

If shallow wells are to be logged, all of the equipment except for the search coil assembly 10 may be located at the surface of the earth. If deeper holes are to be logged, the equipment should be located in the well, except for the output indicators of the vacuum tube voltmeters 91 and 91' and the power supply unit, which may be either a battery or an A. C. rectifier-filter power supply.

In detecting ore bodies in accordance with the invention, whether or not the resistive or the inductive signal will be utilized will depend upon the relative resistive and reactive properties of the body to be located and the medium in which it is embedded. In the case of masses having high conductivity, such as masses of chalcopyrite and pyrrhotite, etc., for example, embedded in poorly conductive ground, it will generally be desirable to reject the inductive component and rely on the resistive component. However, in such case, the frequency should be made low enough to insure that the ratio between the resistive signal corresponding to the body being detected and the resistive signal corresponding to the ground is as great as possible. It can be shown that this ratio will be satisfactory so long as the frequency is such that the inductive reactance of the body being detected is less than its resistance.

On the other hand, where it is desired to detect a conducting body in a moderately conducting, substantially non-magnetic liquid, such as sea water, for example, it will generally be desirable to suppress the resistive component and rely upon the inductive signal. In this case, the frequency should preferably be of the order required to make the inductive reactance of the highly conductive body greater than its resistance.

If the body to be detected is highly conducting and is embedded in a medium which is moderately conducting and also magnetic, such as magnetic sand on a beach, for example, either the inductive or resistive signal may be relied upon, depending upon which results in a more favorable condition of operation, having in mind the relative resistive and reactive properties of the body being detected and of the medium. In general, if, for a frequency at which the inductive reactance and the resistance of the body are equal, the resistive component of the undesired signal given by the medium is less than the inductive component of the undesired signal, it will usually be desirable to rely on the resistive component and to operate at frequency which will make the inductive reactance of the body less than its resistance. On the other hand, if the resistive component of the ground signal is greater than its inductive component under the conditions stated, it will usually be preferable to use the inductive component and to operate at a frequency that will make the inductive reactance of the body greater than its resistance.

Figure 4:
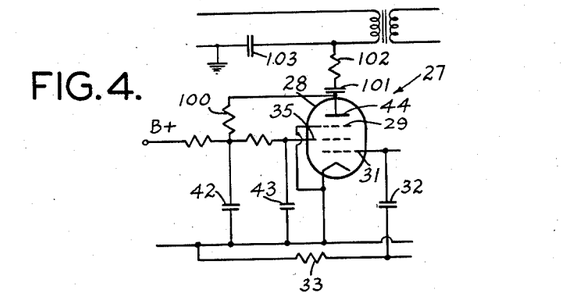
Figures 4 and 5 illustrate schematically alternate forms of circuits for use in the variometer tube circuits.
Figure 5:
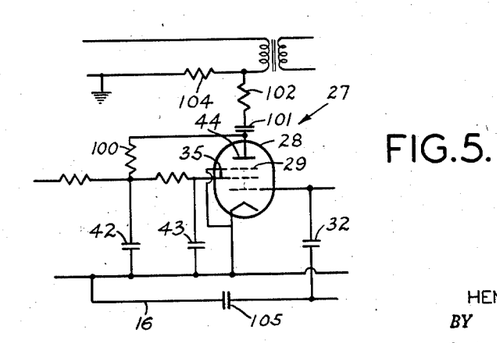

It will be understood that the specific circuits described above can be modified considerably within the scope of the invention. Thus, instead of using a transformer 46 in the variometer tube circuit 27, a plate resistor 100 may be used to develop an output voltage which is fed through a blocking condenser 101 and resistor 102 to a condenser 103 connected in series with the circuit of the receiver coil 13, as shown in Figure 4. The same output may be obtained by substituting a resistor 104 for the condenser 103, and a condenser 105 for the resistor 33 of Figure 4, as shown in Figure 5. Other equivalent circuits will be apparent to those skilled in the art.

It is to be further understood that the circuits employed in the above-described embodiments for exciting the variometer tube and for coupling its output into the receiver coil circuit may be considerably modified within the spirit of the invention. For example, if a reactive component is to be compensated for, as in the Fig. 1 embodiment, the variometer tube might be excited by an A. C. potential difference taken across a condenser in series with the transmitter circuit or through a transformer having a primary winding in the transmitter circuit and a secondary winding supplying an input to the grid of the variometer tube. In either case, the output of the variometer tube should be coupled into the receiver coil circuit by a resistance network so that a reactive component is supplied to the receiver coil circuit. By proper choice of excitation and output coupling for the variometer tube, an output of the desired phase may be readily obtained.

Moreover, the phase selective rectifier 61 referred to herein is merely an example of a typical phase selective rectifier system that is suitable for the purpose. It will be readily apparent that other types of phase selective rectifier systems may be employed, if desired.

In a number of the claims, reference is made to the input and output of a 4-terminal network. For the sake of clarity, it is noted that the 4-terminal network in the several embodiments described above comprises the transmitter coil 11 and the receiver coil 13. The input of the 4-terminal network is the input to the transmitter coil 11 and the output from the network is the output from the receiver coil 13.

While several specific embodiments have been described herein, the invention is not intended to be limited thereto, but is susceptible of numerous changes in form and detail within the scope of the appended claims.

The invention described herein may be manufactured and used by or for the Government for governmental purposes, without payment to the applicant of any royalty thereon.

I claim:

1. An alternating current bridge comprising a transmitter having an oscillator and a first coil system energized by said oscillator, a receiver having a second coil system adjacent to said first coil system, an amplifier connected with said second coil system providing an output responsive to voltages induced in said second coil system, an indicator responsive to the output of said amplifier, adjustable gain amplifying means for supplying to said receiver a signal of such phase and magnitude as substantially to cancel any signal of given phase with respect to the current in said first coil system in the circuit of said receiver, and means for adjusting the gain of said amplifying means automatically in accordance with the magnitude of any signal in the output of said amplifier produced by said signal of given phase in the circuit of said receiver, to effect continuous substantial cancellation of said signal of given phase.

2. An alternating current bridge comprising a transmitter having an oscillator and a first coil system energized by said oscillator, a receiver having a second coil system adjacent to said first coil system, an amplifier connected with said second coil system providing an output responsive to voltages induced in said second coil system, an indicator responsive to the output of said amplifier, an electronic signal transmitting circuit including a variable transconductance electronic tube having a control grid, means for supplying the output of said circuit to said receiver, means for supplying to said control grid a signal such that the signal output of said circuit will be of proper phase and magnitude substantially to cancel any signal of given phase with respect to the current in said first coil system in the circuit of said receiver, and means for controlling the grid bias on said tube in accordance with any signal in the output of said amplifier produced by said signal of given phase in the circuit of said receiver, to effect continuous substantial cancellation of said signal of given phase.

3. An alternating current bridge comprising a transmitter having an oscillator and a first coil system energized by said oscillator, a receiver having a second coil system adjacent to said first coil system, an amplifier connected with said second coil system providing an output responsive to currents induced in said second coil system, an indicator responsive to the output of said amplifier, an electronic signal transmitting circuit including a variable transconductance electronic tube having a control grid, means for supplying the output of said circuit to said receiver, means for supplying to said control grid a signal such that the signal output of said circuit will be of proper phase and magnitude substantially to cancel any signal of given phase with respect to the current in said first coil system in the circuit of said receiver, means for selecting from the output of said amplifier any signal produced by said signal of given phase in the circuit of said receiver, means for rectifying an electrical quantity that is a function of said selected signal, and means for supplying said rectified signal to the control grid of said tube, to effect continuous substantial cancellation of said signal of given phase.

4. Apparatus for detecting the presence of small foreign metal particles, comprising a detector coil system having primary exciting and secondary detecting coils, an alternating current source of substantially constant voltage and frequency for exciting the primary of said coil system, said system having a pair of secondary coils normally connected and adjusted for a balanced condition such that no secondary output voltage is produced, provisions whereby material to be tested may be caused to influence such coils such that if a magnetic particle or particles are present the flux distribution of the coil system will be altered resulting in a secondary coil output voltage, magnetic particles producing an output voltage having a given phase relation relative to the primary voltage and nonmagnetic conductor particles producing eddy currents producing an output voltage having a different phase relation relative to the primary voltage, an electronic amplifier system for amplifying the secondary output voltage of the coil system, said amplifier system including at least one detector responsive only to amplified voltages of one of said phase relations, an electronic tube drift compensator connected to be controlled from the output of said detector, said drift compensator tube having output connections coupled to the input of said amplifier system for the purpose of introducing therein a corrective voltage of said one phase relation to maintain the amplifier system normal input of said one phase relation substantially at zero value, said drift compensator being responsive to slow changes of said one phase relation in the detector output caused by the coil system drifting out of a balanced adjustment condition.

5. Apparatus for detecting the presence of small foreign metal particles, comprising a detector coil system having primary exciting and secondary detecting coils, an alternating current source of substantially constant voltage and frequency for exciting the primary of said coil system, said system having a pair of secondary coils normally connected and adjusted for a balanced condition such that no secondary output voltage is produced, provisions whereby material to be tested may be caused to influence such coils such that if a magnetic particle or particles are present the flux distribution of the coil system will be altered resulting in a secondary coil output voltage, magnetic particles producing an output voltage having one phase relation relative to the primary voltage and nonmagnetic conductor particles producing eddy currents producing an output voltage having a different phase relation relative to the primary voltage, an electronic amplifier system for amplifying the secondary output voltage of the coil system, said amplifier system including two detectors, one responsive only to amplified voltages of said one phase relation and the other responsive only to amplified voltages of quadrature phase relation, electronic tube drift compensators connected to be controlled from the outputs of said detectors, said drift compensator tubes having output connections coupled to the input of said amplifier system for the purpose of introducing therein corrective voltages of said two phase relations to maintain the amplifier system normal input substantially at zero value, said drift compensators being responsive to slow changes in the detector outputs caused by the coil system drifting out of a balanced adjustment condition.

6. Apparatus for detecting the presence of small foreign particles comprising a detector coil system having primary exciting and secondary detector coils, an alternating current source of substantially constant voltage and frequency for exciting the primary of said coil system, said system having a pair of secondary coils normally connected and adjusted for a balanced condition such that no secondary output voltage is produced, provisions whereby material to be tested may be caused to influence such coils such that if a magnetic particle or particles are present the flux distribution of the coil system will be altered resulting in a secondary coil output voltage, magnetic particles producing an output voltage having one phase relation relative to the primary voltage and nonmagnetic conductor particles producing an output voltage having a different phase relation relative to the primary voltage, and an electronic amplifier system for amplifying the secondary output voltage of the coil system, said amplifier system including at least one detector tube having plate, grid and cathode electrodes, and means for controlling the grid-cathode potential of said detector tube in accordance with a function of the amplified secondary output voltage of said coil system and of the voltage from said alternating current source, such that said detector is responsive to the amplified voltages of said one phase relation only.

7. Apparatus for detecting the presence of small foreign particles comprising a detector coil system having primary exciting and secondary detector coils, an alternating current source of substantially constant voltage and frequency for exciting the primary of said coil system, said system having a pair of secondary coils normally connected and adjusted for a balanced condition such that no secondary output voltage is produced, provisions whereby material to be tested may be caused to influence such coils such that if a magnetic particle or particles are present the flux distribution of the coil system will be altered resulting in a secondary coil output voltage, magnetic particles producing an output voltage having one phase relation relative to the primary voltage and nonmagnetic conductor particles producing an output voltage having a different phase relation relative to the primary voltage, and an electronic amplifier system for amplifying the secondary output voltage of the coil system, said amplifier system including at least two detector tubes each having a plurality of electrodes, means for controlling the potential difference between two electrodes of one of said detector tubes in accordance with a function of the amplified secondary output voltage of said coil system and of the voltage from said alternating current source, and means for controlling the potential difference between two electrodes of the other detector tube in accordance with a different function of the amplified secondary output voltage of said coil system and of the voltage from said alternating current source, such that one detector is responsive to only the amplified voltages of one phase relation and the other responsive only to amplified voltages of a quadrature phase relation.

8. In electrical logging where a bridge network having a coil is used to log a bore hole, the method which comprises exciting said bridge and said coil electromagnetically to couple the formations adjacent said bore hole to said network, moving said coil through said bore hole to unbalance said bridge proportionally with respect to variations in the electrical properties of said formations, separating from the unbalance of said bridge a selected time-phase component of said unbalance with respect to the excitation of said bridge network, and measuring said time-phase component for determination of variations in the electrical properties of said formations giving rise to said selected time-phase component of said unbalance.

9. In electrical logging where a bridge network having a coil is used to log a bore hole, the method which comprises exciting said bridge and said coil electromagnetically to couple the formations adjacent said bore hole to said network, moving said coil through said bore hole to unbalance said bridge proportionally with respect to variations in the susceptibility and conductivity of said formations, separating the unbalance signal from said bridge into a component in phase and a component out of phase with respect to the excitation of said bridge network, and separately measuring said components for determination of variations in resistivity and susceptibility of said formations.

10. A system for measuring the conductivity and susceptibility of earth formations penetrated by a bore hole which comprises an exploring unit including a bridge network, an inductance in one arm of said bridge network disposed in inductively coupled relation to strata adjacent thereto, means for lowering and raising said exploring unit in said bore hole for travel of said inductance past said formations to produce an unbalance voltage in said bridge network, detecting means including phase-shifting circuit-components for separating said unbalance voltage into a resistive and reactive component and means for measuring said components as a function of the location of said exploring unit in said bore hole.

11. A system for recording conductivity and susceptibility of earth formations penetrated by a bore hole which comprises an exploring solenoid, a bridge network, said solenoid forming one arm of said bridge network, said network having output terminals and input terminals for application to said network of low frequency alternating current signals for exciting said bridge, means for moving said solenoid through said bore hole and adjacent said formations to produce an unbalance signal between said output terminals of said bridge network proportional to the conductivity and susceptibility of said formations, a detecting circuit connected to said output terminals and responsive to said unbalance signal, a circuit coupling said detecting circuit to said source of low frequency signals, and phasing means in said detecting circuit utilizing said low frequency signals as a reference to separate said unbalance signal into an in-phase component and an out-of-phase component, and means for recording said components as a function of the location of said solenoid in said bore hole.

12. A system for measuring changes in the electrical character of formations penetrated by a bore hole which comprises an exploring unit movable along the bore hole and including as a component part thereof an alternating current bridge network having an elongated inductance forming one arm of said network and disposed lengthwise of said bore hole for producing an electromagnetic field in the strata adjacent thereto, said bridge having circuit-connections for application thereto of alternating current input signals and output connections, means for establishing balanced conditions in said bridge network with said exploring unit in a predetermined position, means for moving said exploring unit in said bore hole past said formations to unbalance said bridge in accordance with variations in the electrical properties of said formations for production of signals, and measuring means including a detecting circuit having branches respectively connected to said circuit-connections and to said output connections in which the signals applied thereto are opposed, said measuring means including an element movable in accordance with the algebraic difference between said signals to indicate an electrical characteristic of said formations.

13. The combination set forth in claim 12 in which said detecting circuit includes signal-dividing means for producing one component varying with one electrical characteristic of said formations and a second component varying with a different electrical characteristic of said formations, thereby simultaneously to secure information as to different electrical characteristics of the same formations.

14. The combination set forth in claim 12 in which said detecting circuit includes a signal-dividing means for production of a component which varies in accordance with the permeability of said formations and a second component which varies in accordance with the conductivity of said formations.

15. A system for measuring changes in the character of formations penetrated by a bore hole comprising an exploring unit adapted to be lowered and raised in said bore hole for movement past said formations, said unit including a balanceable alternating current bridge network, said bridge having output terminals and input terminals for application to said bridge of alternating current, an inductance coil electrically connected in one arm of said network and mechanically supported by said unit in position for electromagnetic coupling with said formations for unbalancing said bridge to produce output signals at said output terminals varying with change in the electrical characteristics of said formations, measuring means including a phase-comparing network having an output circuit and two input circuits, connecting means between said input terminals and one of said input circuits for applying to said one of said input circuits a reference signal from said alternating current source, connecting means extending between said output terminals and said other of said input circuits for applying to said other of said input circuits said output signals from said bridge, one of said connecting means having phase-shifting circuit-components for selective comparison of a selected time-phase component of said output signals with respect to said reference signal, and said measuring means including an element for indicating the magnitude of said selected time-phase component relative to said reference signal.

16. A system for measuring changes in the character of formations penetrated by a bore hole comprising an exploring unit adapted to be lowered and raised in said bore hole for movement past said formations, said unit including a balanceable alternating current bridge network, said bridge having output terminals and input terminals for application to said bridge of alternating current, an inductance coil electrically connected in one arm of said network and mechanically supported by said unit in position for electromagnetic coupling with said formations for unbalancing said bridge to produce output signals at said output terminals varying with change in the electrical characteristics of said formations, measuring means including a phase-comparing network having an output circuit and two input circuits, connecting means between said input terminals and one of said input circuits for applying to said one of said input circuits a reference signal from said alternating current source, connecting means extending between said output terminals and said other of said input circuits for applying to said other of said input circuits said output signals from said bridge, one of said connecting means having phase-shifting circuit-components for selective comparison of an in-phase component of said output signals with respect to said reference signal, and said measuring means including an element for indicating the magnitude of said in-phase component relative to said reference signal.

17. A system for measuring changes in the character of formations penetrated by a bore hole comprising an exploring unit adapted to be lowered and raised in said bore hole for movement past said formations, said unit including a balanceable alternating current bridge network, said bridge having output terminals and input terminals for application to said bridge of alternating current, an inductance coil electrically connected in one arm of said network and mechanically supported by said unit in position for electromagnetic coupling with said formations for unbalancing said bridge to produce output signals at said output terminals varying with change in the electrical characteristics of said formations, measuring means including a phase-comparing network having an output circuit and two input circuits, connecting means between said input terminals and one of said input circuits for applying to said one of said input circuits a reference signal from said alternating current source, connecting means extending between said output terminals and said other of said input circuits for applying to said other of said input circuits said output signals from said bridge, one of said connecting means having phase-shifting circuit-components for selective comparison of an out-of-phase component of said output signals with respect to said reference signal, and said measuring means including an element for indicating the magnitude of said out-of-phase component relative to said reference signal.

18. A system for measuring changes in the character of formations penetrated by a bore hole comprising an exploring unit adapted to be lowered and raised in said bore hole for movement past said formations, said unit including a balanceable alternating current bridge network, said bridge having output terminals and input terminals for application to said bridge of alternating current, an inductance coil electrically connected in one arm of said network and mechanically supported by said unit in position for electromagnetic coupling with said formations for unbalancing said bridge to produce output signals at said output terminals varying with change in the electrical characteristics of said formations, measuring means including a phase-comparing network having an output circuit and two input circuits, connecting means between said input terminals and one of said input circuits for applying to said one of said input circuits a reference signal from said alternating current source, connecting means extending between said output terminals and said other of said input circuits for applying to said other of said input circuits said output signals from said bridge, each of said connecting means having phase-shifting circuit-components which respectively modify the reference signal for comparison respectively of the in-phase and out-of-phase components of said output signals, and said measuring means including elements for respectively indicating the magnitude of said in-phase and said out-of-phase components.

19. A system for measuring changes in the character of formations penetrated by a bore hole comprising an exploring unit adapted to be lowered and raised in said bore hole for movement past said formations, said unit including a balanceable alternating current bridge network, said bridge having output terminals and input terminals for application thereto of alternating current, an inductance electrically connected in one arm of said network and mechanically supported by said unit in position for electromagnetic coupling with said formations for unbalancing said bridge to produce output signals at said output terminals dependent upon electrical characteristics of said formations, measuring means including two phase-sensitive networks, circuit connections for applying to each of said networks said output signals from said bridge and for applying thereto the alternating current applied to said input terminals of said bridge, said measuring means including circuit components for a comparison in one of said phase-sensitive networks of the in-phase component of said output signal with respect to said alternating current and establishing in said other phase-sensitive network a comparison of the quadrature component of said output signal with reference to said alternating current, and means connected to each of said phase-sensitive networks for indicating the magnitude respectively of said in-phase component and said quadrature component of said output signal.

20. In a four-terminal alternating current network having an input circuit adapted to receive an input current and an output circuit adapted to provide an output, the combination of adjustable gain amplifying means for combining with said network output a signal of such phase and magnitude as substantially to cancel any signal variations in said output of given phase with respect to said input current, and phase selective means responsive to the magnitude of any signal of said given phase only in said network output, for automatically adjusting the gain of said amplifying means to effect continuous substantial cancellation of said variations in said signal of said given phase in said output.

21. In a four-terminal alternating current network having an input circuit adapted to receive an input current and an output circuit adapted to provide an output, the combination of adjustable gain amplifying means for combining with said network output a signal of such phase and magnitude as substantially to cancel any signal in said output of given phase with respect to said input current, and phase selective means responsive to the magnitude of any signal of said given phase only in said network output for automatically adjusting the gain of said amplifying means to effect continuous substantial cancellation of said signal of given phase in said output.

22. In a four-terminal alternating current network having an input circuit adapted to receive an input current and an output circuit adapted to provide an output, the combination of adjustable gain amplifying means for combining with said network output a signal of such phase and magnitude as substantially to cancel any signal in said output of given phase with respect to said input current, phase selective means responsive to the magnitude of any signal of said given phase only in said network output for automatically adjusting the gain of said amplifying means to effect continuous substantial cancellation of said signal of given phase, and means for providing indications of variations in said signal combined with said network output.

23. In a four-terminal alternating current network having an input circuit adapted to receive an input current and an output circuit adapted to provide an output, the combination of adjustable gain amplifying means for combining with said network output a signal of such phase and magnitude as substantially to cancel any signal in said output of given phase with respect to said input current, phase selective means responsive to the magnitude of any signal of said given phase only in said network output for automatically adjusting the gain of said amplifying means to effect continuous substantial cancellation of said signal of given phase, means responsive to another signal component of different phase in said network output, and means for providing indications of variations in said signal combined with said network output.

24. In a four-terminal alternating current network having an input circuit adapted to receive an input current and an output circuit adapted to provide an output, the combination of first adjustable gain amplifying means for combining with said network output a signal of such phase and magnitude as to substantially cancel any signal in said output of given phase with respect to said input current, second adjustable gain amplifying means for combining with said network output a signal of such phase and magnitude as substantially to cancel any signal in said output that is in phase quadrature with respect to said signal of given phase, first phase selective means responsive to the magnitude of any signal of said given phase only in said network output to effect continuous substantial concellation of said signal of given phase, and second phase selective means responsive to the magnitude of any signal of said quadrature phase only in said network output to effect continuous substantial cancellation of said signal of quadrature phase.

25. In a four-terminal alternating current network having an input circuit adapted to receive an input current and an output circuit adapted to provide an output, the combination of first adjustable gain amplifying means for combining with said network output a signal of such phase and magnitude as substantially to cancel any signal in said output of given phase with respect to said input current, second adjustable gain amplifying means for combining with said network output a signal of such phase and magnitude as substantially to cancel any signal in said output that is in phase quadrature with respect to said signal of given phase, first phase selective means responsive to the magnitude of any signal of said given phase only in said network output to effect continuous substantial cancellation of said signal of given phase, second phase selective means responsive to the magnitude of any signal of said quadrature phase only in said network output to effect continuous substantial cancellation of said signal of quadrature phase, means for providing indications of variations in said first cancelling signal, and means for providing indications of variations in said second cancelling signal.

26. In a four-terminal alternating current network having an input circuit adapted to receive an input current and an output circuit adapted to provide an output, the combination of an electronic signal transmitting circuit including a variable transconductance electronic tube having a control grid, means for combining the output of said circuit with the output of said network, means for supplying to said control grid a signal such that the signal output of said circuit will be of proper phase and magnitude substantially to cancel any signal in said network output of given phase with respect to said input current, and phase selective means responsive to any signal of said given phase only in said network output for automatically controlling the grid bias on said tube to effect continuous substantial cancellation of said signal of given phase.

27. In a four-terminal alternating current network having an input circuit adapted to receive an input current and an output circuit adapted to provide an output, the combination of an electronic signal transmitting circuit including a variable transconductance electronic tube having a control grid, means for combining the output of said circuit with the output of said network, means for supplying to said control grid a signal such that the signal output of said circuit will be of proper phase and magnitude substantially to cancel any signal in said network output of given phase with respect to said input current, means for selecting from said network output any signal of said given phase only, means for rectifying an electrical quantity that is a function of said selected signal, and means for supplying said rectified signal to the control grid of said tube to effect continuous substantial cancellation of said signal of given phase.

28. In a four-terminal alternating current network having an input circuit adapted to receive an input current and an output circuit adapted to provide an output, the combination of a first electronic signal transmitting circuit including a first variable transconductance electronic tube having a control grid, first means for combining the output of said first signal transmitting circuit with the output of said network, first means for supplying to said first control grid a signal such that the signal output of said first circuit will be of proper phase and magnitude substantially to cancel any signal of given phase with respect to said input current in said network output, first means for selecting from said network output any signal of said given phase only, first means for rectifying an electrical quantity that is a function of said first selected signal, first means for supplying said first rectified signal to the control grid of said first tube to effect continuous substantial cancellation of said signal of given phase in said network output, a second electronic signal transmitting circuit including a second variable transconductance electronic tube having a control grid, second means for combining the output of said second signal transmitting circuit with the output of said network, second means for supplying to said second control grid a signal such that the signal output of said second circuit will be of proper phase and magnitude substantially to cancel any signal in said network output that is in phase quadrature with respect to said signal of given phase, second means for selecting from said network output any signal of said quadrature phase only, second means for rectifying an electrical quantity that is a function of said second selected signal, and second means for supplying said second rectified signal to the control grid of said second tube to effect continuous substantial cancellation of said signal of quadrature phase in said network output.

29. In a four-terminal alternating current network having an input circuit adapted to receive an output current and an output circuit adapted to provide an output, the combinaton of a first electronic signal transmitting circuit including a first variable transconductance electronic tube having a control grid, first means for combining the output of said first signal transmitting circuit with the output of said network, first means for supplying to said first control grid a signal such that the signal output of said first circuit will be of proper phase and magnitude substantially to cancel any signal of given phase with respect to said input current in said network output, first means for selecting from said network output any signal of said given phase only, first means for rectifying an electrical quantity that is a function of said first selected signal, first means for supplying said first rectified signal to the control grid of said first tube to effect continuous substantial cancellation of said signal of given phase in the output of said network, a second electronic signal transmitting circuit including a second variable transconductance electronic tube having a control grid, second means for combining the output of said second signal transmitting circuit with the output of said network, second means for supplying to said second control grid a signal such that the signal output of said second circuit will be of proper phase and magnitude substantially to cancel any signal in said network output that is in phase quadrature with said signal of given phase, second means for selecting from said network output any signal of said quadrature phase only, second means for rectifying an electrical quantity that is a function of said second selected signal, second means for supplying said second rectified signal to the control grid of said second tube to effect continuous substantial cancellation of said signal of quadrature phase, means for providing indications of variations in the magnitude of the output of said first circuit and means for providing indications of variations in the magnitude of the output of said second circuit.

30. In a system for locating materials of given physical properties, the combination of transmitter coil means and receiver coil means adapted to be positioned in detecting relation to material to be investigated, an alternating current source for energizing said transmitter coil means, adjustable gain amplifying means for injecting into said receiver coil means a voltage of proper phase and magnitude substantially to cancel any signal of given phase with respect to the transmitter coil current in said receiver coil means, electrical means responsive to any signal of said given phase in said receiver coil means for automatically adjusting the gain of said amplifying means to effect substantial cancellation of any signal of said given phase in said receiver coil means and means for providing indications of the output of said receiver coil means.

31. In apparatus for searching for highly conductive bodies in poorly conducting ground, the combination of transmitter coil means and receiver coil means adapted to be disposed in detecting relation to said conducting ground, means for energizing said transmitter coil means with alternating current that is low enough in frequency to induce in said receiver coil means a resistive signal of appreciable magnitude representative of a highly conducting body, adjustable gain amplifying means for injecting into said receiver coil means a signal of proper phase and magnitude substantially to cancel any reactive signal therein, and means for automatically adjusting the gain of said amplifying means in accordance with the magnitude of any reactive signal in said receiver coil means to effect substantial cancellation of said reactive signal in said receiver coil means, and means providing indications of said resistive signal in said receiver coil means.

32. In a system for locating materials of given physical properties, the combination of transmitter coil means and receiver coil means adapted to be positioned in detecting relation to material to be investigated, an alternating current source for energizing said transmitter coil means, adjustable gain amplifying means for injecting into said receiver coil means a voltage of proper phase and magnitude substantially to cancel any signal of given phase with respect to the transmitter coil current in said receiver coil means, and electrical means responsive to any signal of said given phase in said receiver coil means for adjusting the gain of said amplifying means automatically to effect substantial cancellation of any signal of said given phase in said receiver coil means.

33. In a system for locating materials of given physical properties, the combination of transmitter coil means and receiver coil means adapted to be positioned in detecting relation to material to be investigated, an alternating current source for energizing said transmitter coil means, adjustable gain amplifying means for injecting into said receiver coil means a voltage of proper phase and magnitude substantially to cancel any signal of given phase with respect to the transmitter coil current in said receiver coil means, electrical means responsive to any signal of said given phase in said receiver coil means for adjusting the gain of said amplifying means automatically to effect substantial cancellation of any signal of said given phase in said receiver coil means, means for providing indications of the output of said receiver coil means, and means for providing indications of variations in the output of said amplifying means.

34. In a system for locating materials of given physical properties, the combination of transmitter coil means and receiver coil means adapted to be positioned in detecting relation to material to be investigated, an alternating current source for energizing said transmitter coil means, first adjustable gain amplifying means for injecting into said receiver coil means a voltage of proper phase and magnitude substantially to cancel any signal of given phase with respect to the transmitter coil current in said receiver coil means, first electrical means responsive to any signal of said given phase in said receiver coil means for adjusting the gain of said first amplifying means automatically to effect substantial cancellation of any signal of said given phase in said receiver coil means, second adjustable gain amplifying means for injecting into said receiver coil means a voltage of proper phase and magnitude substantially to cancel any signal that is in phase quadrature with said signal of given phase in said receiver coil means, second electrical means for adjusting the gain of said second amplifying means automatically to effect substantial cancellation of any signal of said quadrature phase in said receiver coil means, means for providing indications of variations in the output of said first amplifying means, and means for providing indications of variations in the output of said second amplifying means.

35. In apparatus for investigating materials, the combination of transmitter coil means and receiver coil means adapted to be disposed in detecting relation to a material, means for energizing said transmitter coil means with alternating current, means for selecting from the output of said receiver coil means a signal component of given phase with respect to said energizing alternating current, adjustable gain amplifying means for injecting into said receiver coil means a signal of proper phase and magnitude substantially to cancel any signal component of said given phase in said receiver coil means, and means for automatically adjusting the gain of said amplifying means in accordance with any signal of said given phase in said receiver coil means to effect substantial cancellation of said signal of given phase in said receiver coil means.

36. In apparatus for investigating earth formation traversed by a bore hole, the combination of transmitter coil means and receiver coil means adapted to be disposed in detecting relation in a bore hole, means for energizing said transmitter coil means with alternating current, means for selecting from the output of said receiver coil means a signal component of given phase with respect to said energizing alternating current, means for injecting into said receiver coil means a signal of proper phase and magnitude substantially to cancel any signal component of said given phase in said receiver coil means, means for automatically controlling the injection of said signal in accordance with any signal of said given phase in said receiver coil means to effect substantial cancellation of said signal of given phase in said receiver coil means, and means for obtaining indications of the output of said receiver coil means.

37. In apparatus for investigating earth formation traversed by a bore hole, the combination of transmitter coil means and receiver coil means adapted to be disposed in detecting relation in a bore hole, means for energizing said transmitter coil means with alternating current, means for selecting from the output of said receiver coil means a signal component of given phase with respect to said energizing alternating current and another signal component in quadrature with said signal component of given phase, means for injecting into said receiver coil means two signals in quadrature and of proper phase and magnitude substantially to cancel any signal components of said given phase or of said quadrature phase in said receiver coil means, means for automatically adjusting the gain of said amplifying means, respectively, in accordance with any signals of said given phase or of said quadrature phase, respectively, in said receiver coil means to effect substantial cancellation of said signals of given phase and quadrature phase in said receiver coil means, and means for obtaining indications of variations in the magnitudes of said injected signals.

38. In apparatus for searching for conducting bodies in magnetic earth, the combination of transmitter coil means and receiver coil means adapted to be disposed in detecting relation to the earth, means for energizing said transmitter coil means with alternating current, thereby inducing in said receiver coil means a resistive signal representative of a conducting body and a reactive signal representative of magnetic earth, adjustable gain amplifying means for injecting into said receiver coil means a signal of proper phase and magnitude substantially to cancel said reactive signal, and means for automatically adjusting the gain of said amplifying means in accordance with the magnitude of any reactive signal in said receiver coil means to effect substantial cancellation of said reactive signal in said receiver coil means.

39. In apparatus for searching for magnetic bodies in a conducting medium, the combination of transmitter coil means and receiver coil means adapted to be disposed in detecting relation to said conducting medium, means for energizing said transmitter coil means with alternating current, thereby inducing in said receiver coil means a resistive signal representative of said conducting medium and a reactive signal representative of a magnetic body, adjustable gain amplifying means for injecting into said receiver coil means a signal of proper phase and magnitude substantially to cancel said resistive signal, and means for automatically adjusting the gain of said amplifying means in accordance with the magnitude of any resistive signal in said receiver coil means to effect substantial cancellation of said resistive signal in said receiver coil means.

40. In apparatus for searching for conducting bodies embedded in a medium, the combination of transmitter coil means and receiver coil means adapted to be disposed in detecting relation to said medium, means for energizing said transmitter coil means with alternating current of such frequency that the ratio between a signal component of given phase with respect to the transmitter coil current, which is representative of a typical embedded conducting body being sought, and a corresponding signal component produced by the medium is relatively large, adjustable gain amplifying means for injecting into said receiver coil means a signal of proper phase and magnitude substantially to cancel any signal in quadrature with said given phase, means for automatically adjusting the gain of said amplifying means in accordance with the magnitude of any signal of said quadrature phase in said receiver coil means to effect substantial cancellation of said signal of said quadrature phase in said receiver coil means, and means for obtaining indications of said embedded conducting body signal component.

41. In apparatus for searching for conducting bodies embedded in a medium, the combination of transmitter coil means and receiver coil means adapted to be disposed in detecting relation to said medium, means for energizing said transmitter coil means with alternating current of such frequency that the inductive reactance of a typical embedded conducting body to be located is less than its resistance, adjustable gain amplifying means for injecting into said receiver coil means a signal of proper phase and magnitude substantially to cancel any reactive signal therein, means for automatically adjusting the gain of said amplifying means in accordance with the magnitude of any reactive signal in said receiver coil means to effect substantial cancellation of said reactive signal in said receiver coil means, and means for obtaining indications of resistive signal components in said receiver coil means.

42. In apparatus for searching for conducting bodies embedded in a medium, the combination of transmitter coil means and receiver coil means adapted to be disposed in detecting relation to said medium, means for energizing said transmitter coil means with alternating current of such frequency that the inductive reactance of a typical embedded conducting body to be located is greater than its resistance, adjustable gain amplifying means for injecting into said receiver coil means a signal of proper phase and magnitude substantially to cancel any resistive signal therein, means for automatically adjusting the gain of said amplifying means in accordance with the magnitude of any resistive signal in said receiver coil means to effect substantial cancellation of said resistive signal in said receiver coil means, and means for obtaining indications of inductive signal components of said receiver coil means.

References Cited in the file of this patent
UNITED STATES PATENTS

| Number | Name | Date |
| --- | --- | --- |
| 2,082,997 | Zuschlag | June 8, 1937 |
| 2,117,390 | Zuschlag | May 17, 1938 |
| 2,119,367 | Atny | May 31, 1938 |
| 2,161,418 | Jones | June 6, 1939 |
| 2,170,857 | Elliott | Aug. 29, 1939 |
| 2,220,070 | Aiken | Nov. 5, 1940 |
| 2,225,668 | Subkow | Dec. 24, 1940 |
| 2,250,703 | Crites | July 29, 1941 |
| 2,358,441 | Bowsky | Sept. 19, 1944 |
| 2,375,778 | Evjen | May 15, 1945 |
| 2,390,409 | Aiken | Dec. 4, 1945 |
| 2,428,155 | Guyod | Sept. 30, 1947 |
| 2,435,985 | Stewart | Feb. 17, 1948 |
| 2,436,563 | Trosh | Feb. 24, 1948 |
| 2,446,527 | Chun | Aug. 10, 1948 |
| 2,456,401 | Gilmore | Dec. 14, 1948 |
| 2,470,828 | Millington | May 24, 1949 |
| 2,483,718 | Aiken | Oct. 4, 1949 |
| 2,489,920 | Michel | Nov. 29, 1949 |
| 2,535,666 | Broding | Dec. 26, 1950 |
| 2,608,602 | Muffly | Aug. 26, 1952 |